Oct. 8, 1963 S. C. KOLANOWSKI ETAL 3,106,706

RAILWAY CAR IDENTIFICATION SYSTEM

Filed Aug. 8, 1957 10 Sheets-Sheet 1

INVENTORS.
Stanley C. Kolanowski
Maryan W. Plaza
Edward W. Ernst
By: Wupper, Gradolph & Love
Attys.

INVENTORS.
Stanley C. Kolanowski
Maryan W. Plaza
Edward W. Ernst
By: Wupper, Gradolph & Love
Attys.

INVENTORS.
Stanley C. Kolanowski
Maryan W. Plaza
Edward W. Ernst
By: Wuppot, Gradolph & Love
Attys.

INVENTORS.
Stanley C. Kolanowski
Maryan W. Plaza
Edward W. Ernst
By: Wysper, Gradolph & Love
Attys.

INVENTORS.
Stanley C. Kolanowski
Maryan W. Plaza
Edward W. Ernst
By: Wupper, Gradolph & Love
Attys.

INVENTORS.
Stanley C. Kolanowski
Maryan W. Plaza
Edward W. Ernst
By: Wupper, Gradolph & Love
Attys.

INVENTORS.
Stanley C. Kolanowski
Maryan W. Plaza
Edward W. Ernst
By: Wupper, Gradolph & Love
Attys.

Oct. 8, 1963 S. C. KOLANOWSKI ETAL 3,106,706

RAILWAY CAR IDENTIFICATION SYSTEM

Filed Aug. 8, 1957

10 Sheets-Sheet 8

INVENTORS.
Stanley C. Kolanowski
Maryan W. Plaza
Edward W. Ernst
By: Wupper, Gradolph & Love
Attys.

RAILWAY CAR IDENTIFICATION SYSTEM

Filed Aug. 8, 1957

10 Sheets-Sheet 9

Inventors:
Stanley C. Kolanowski
Maryan W. Plaza
Edward W. Ernst
By: Wupper, Gradolph & Love
Attys.

Inventors.
Stanley C. Kolanowski
Maryan W. Plaza
Edward W. Ernst
By: Wupper, Gradolph & Love
Attys.

United States Patent Office 3,106,706

Patented Oct. 8, 1963

3,106,706

RAILWAY CAR IDENTIFICATION SYSTEM

Stanley C. Kolanowski, Chicago, Maryan W. Plaza, River Grove, and Edward W. Ernst, Elmhurst, Ill., assignors to Stewart-Warner Corporation, Chicago, Ill., a corporation of Virginia Filed Aug. 8, 1957, Ser. No. 677,069
19 Claims. (Cl. 340—345)

Our invention relates generally to an apparatus for recording and translating information as to the movement of freight and passenger railroad cars, which information may be utilized for improvement in railroad traffic control, for interline accounting, for increasing the speed of assembly of cars into trains, for making records of weights of freight cars and their loads, recording analyses of samples of bulk loads, and in various other ways facilitating economical railroad operation and accounting.

The invention may be best understood following a brief review of the present methods of operation of railroads in the United States.

The two million or so railway cars in operation in the United States are owned individually by a number of railroads, but are routed over many different lines. The company owning a particular car receives from the line upon which the car is traveling, or upon the tracks of which it is standing, a per diem rental fee. Thus it is apparent that highly complex accounting procedures are necessary for allotting to each railroad for the many cars which may be owned by it, the per diem total owed to it by other railway companies, and those which it owes to other railroads. Additionally, each railroad company must have records upon which demurrage must be computed and billed to the shipper or to the consignee.

In practice, it is customary to record the date upon which each car is transferred from one line to another. Such records are generally individually made by the several lines over which the car is traveling or upon which it is standing, with the result that there is considerable duplication in accounting effort, because as each train leaves a marshaling yard, the "consist" of the train, the railroad name, and the number of cars must be manully recorded so that the location of each of the cars may be determined continuously to enable a computation of interline credits and debits for the car rental per diem.

Such records of the "consist" of each train of cars is also useful in checking the waybills from which the division of the tariffs, or freight charges, among several railroads is determined.

The information relative to the "consist" of a train usually is sent by telegraph or Teletype from one checking point to another, and this involves further clerical work in the course of which errors may occur, with the consequent necessity for rechecking. In fact, because of such errors freight cars frequently become "lost," with consequent loss of revenue to the owner thereof and increase in the cost of freight service due to the lack of full use of the equipment.

It is thus an object of the present invention to provide an improved method and means for rapidly and automatically identifying freight cars as to ownership, number, and type, as the trains move out of or into marshaling yard and past other check locations, to obviate the necessity of a clerk for manually checking and recording such identification data, and to provide a record in the form of a punched tabulating card or other information storing medium, usually providing a printed record, and in some instances providing means for automatically or semi-automatically transmitting such information by Teletype, or the like to a remote station.

A further object is to provide indicia upon a railroad car adapted to be read by a stationary photoelectric means, and in which the indicia includes markings for triggering the reading of the remaining indicia on the car, as the car is moving past the reading means.

A further object is to provide a method of reading indicia from a railroad car while it is in motion, temporarily storing the indicia which has been read, reading out the indicia temporarily stored, and recording the read out indicia.

A further object is to provide means and a method for attaining the above objectives, while a train of railroad cars is moving at high speed relative to the means for reading the indicia on the cars.

A further object is to provide a method and apparatus whereby the indicia on the railroad car can be in a standard quasibinary code, such as the Teletype or bident code for instance, so that commercially available equipment can be used for information transmission and for computing operations.

A further object is to provide means for accomplishing the methods set forth in the foregoing objects, in a simple and economical manner, utilizing quite largely components which are well known and available commercially.

Other objects and advantages will become apparent from the following description of a preferred embodiment of our invention which is illustrated in the accompanying drawings.

In the drawings in which similar characters of reference refer to similar elements throughout the several views.

Figure 2:
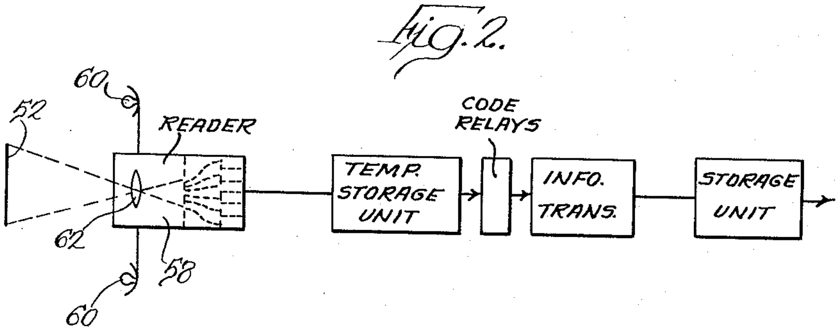
FIG. 2 is a simplified block diagram showing one form the information reading and transmitting system may take.
Figure 6:
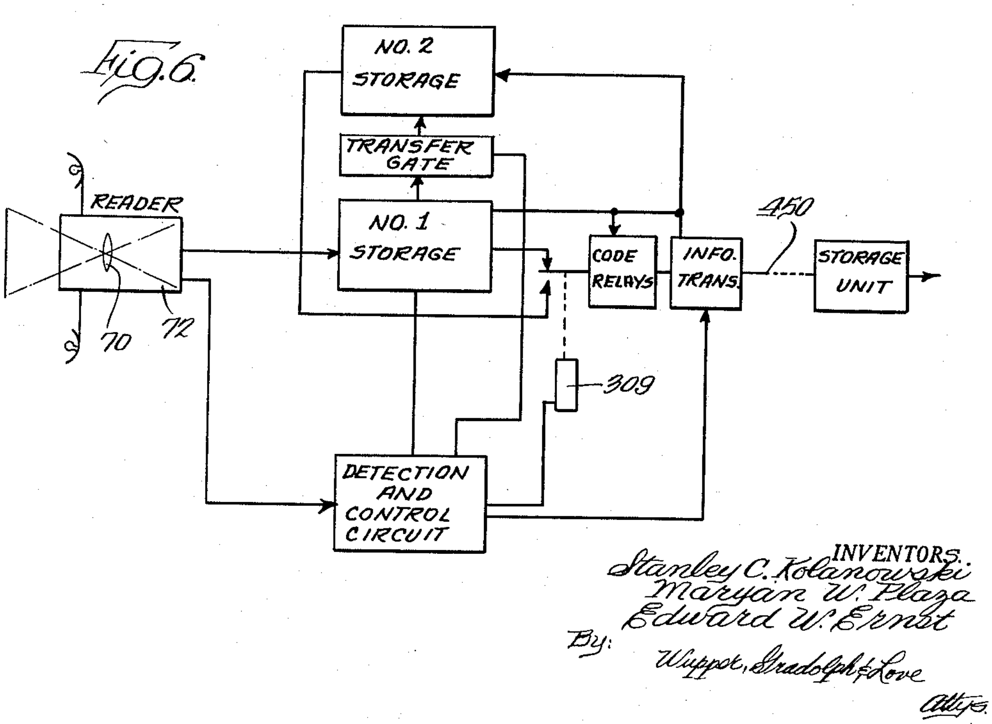
FIG. 6 is a block diagram showing another form the information reading and transmitting system may take.
Figure 10A:
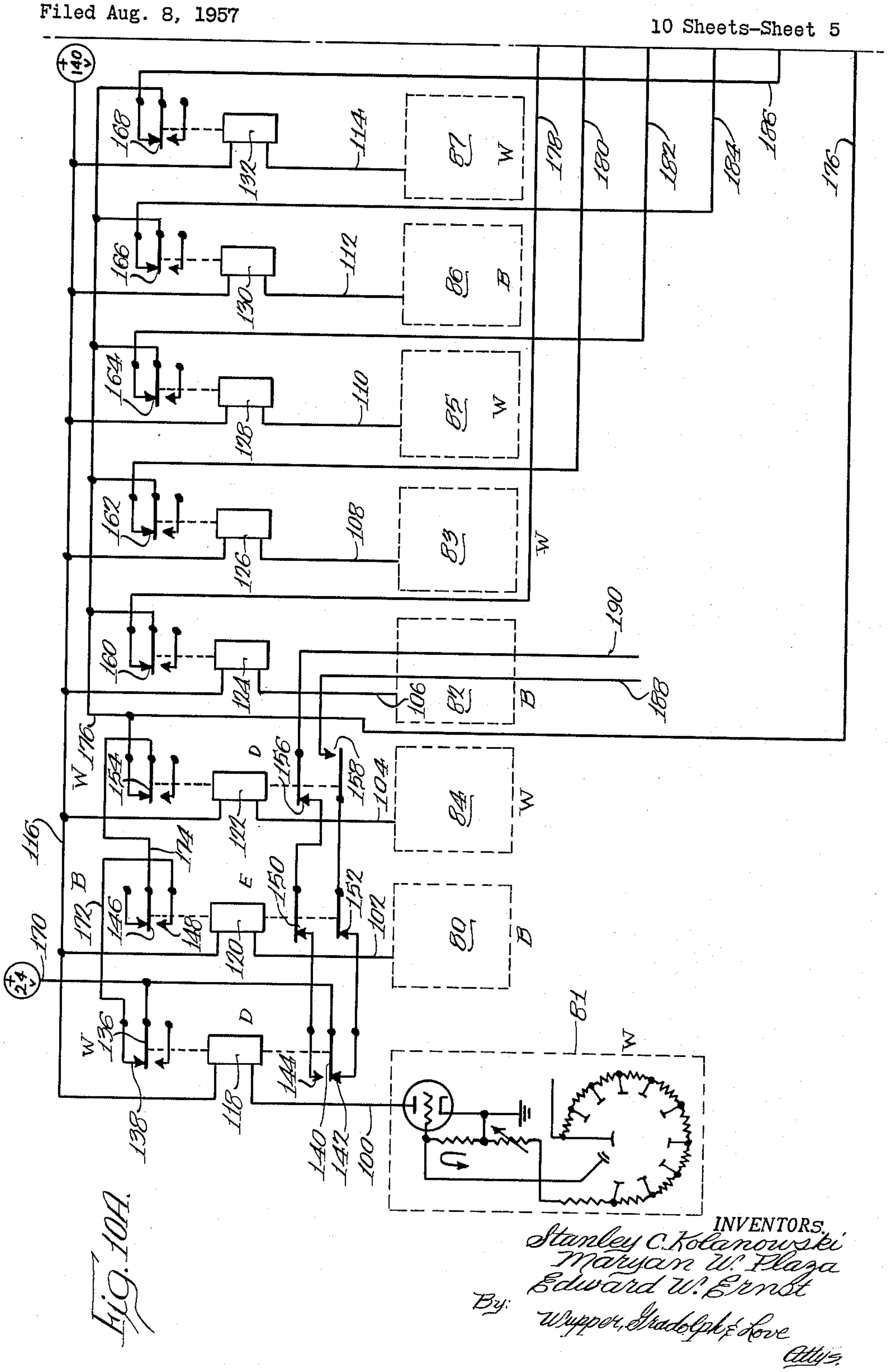
Figure 10B:
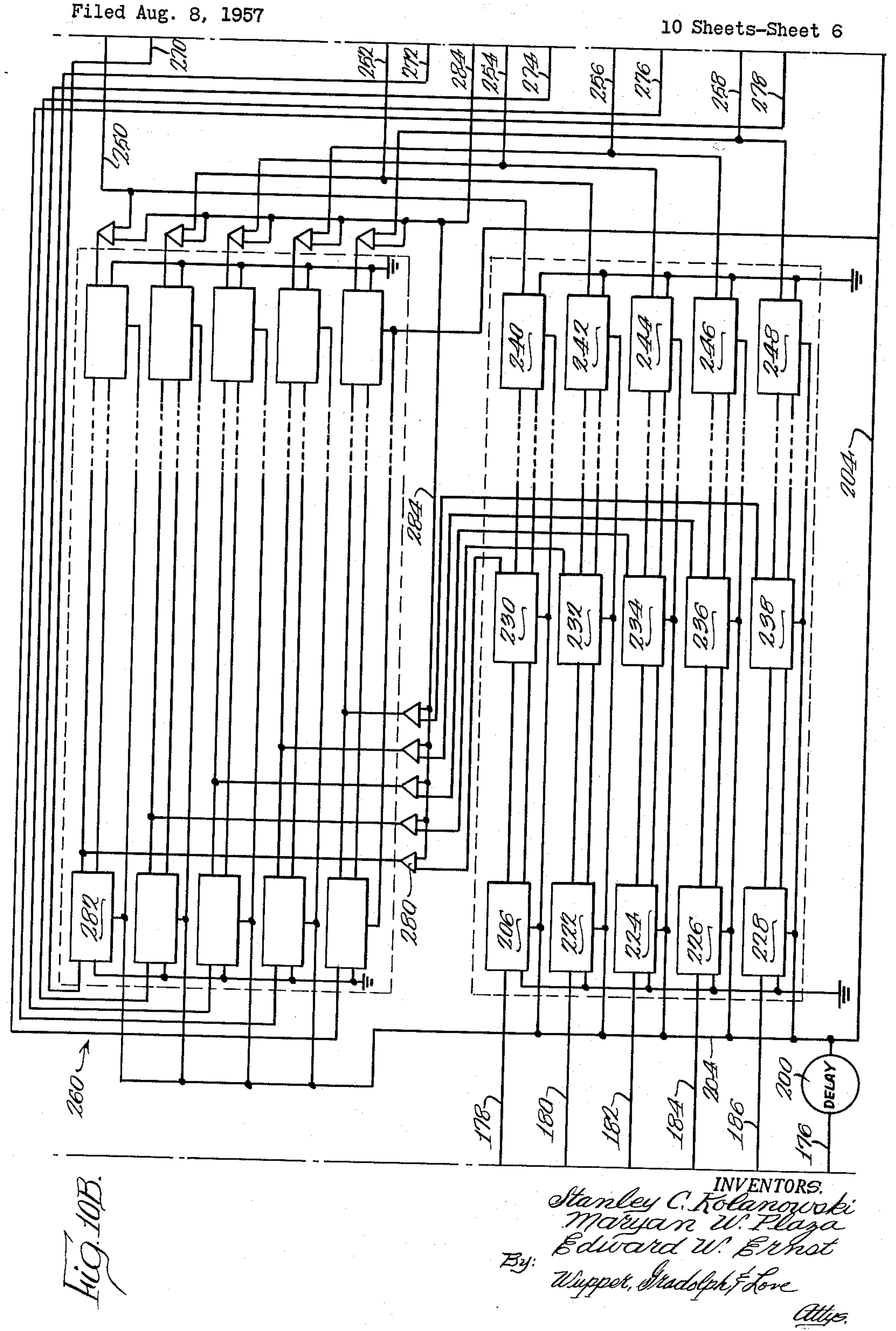
Figure 11:
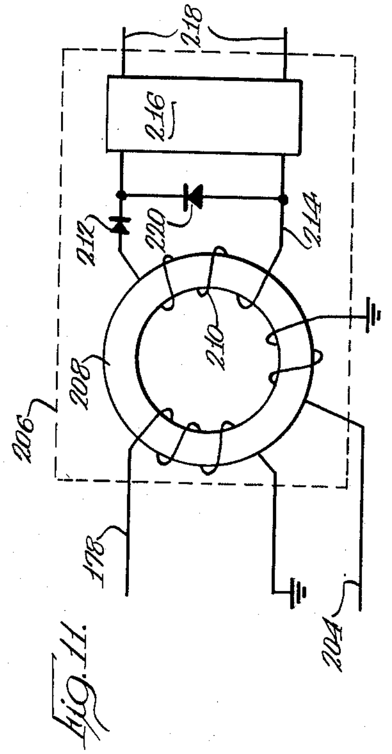
Figure 12A:
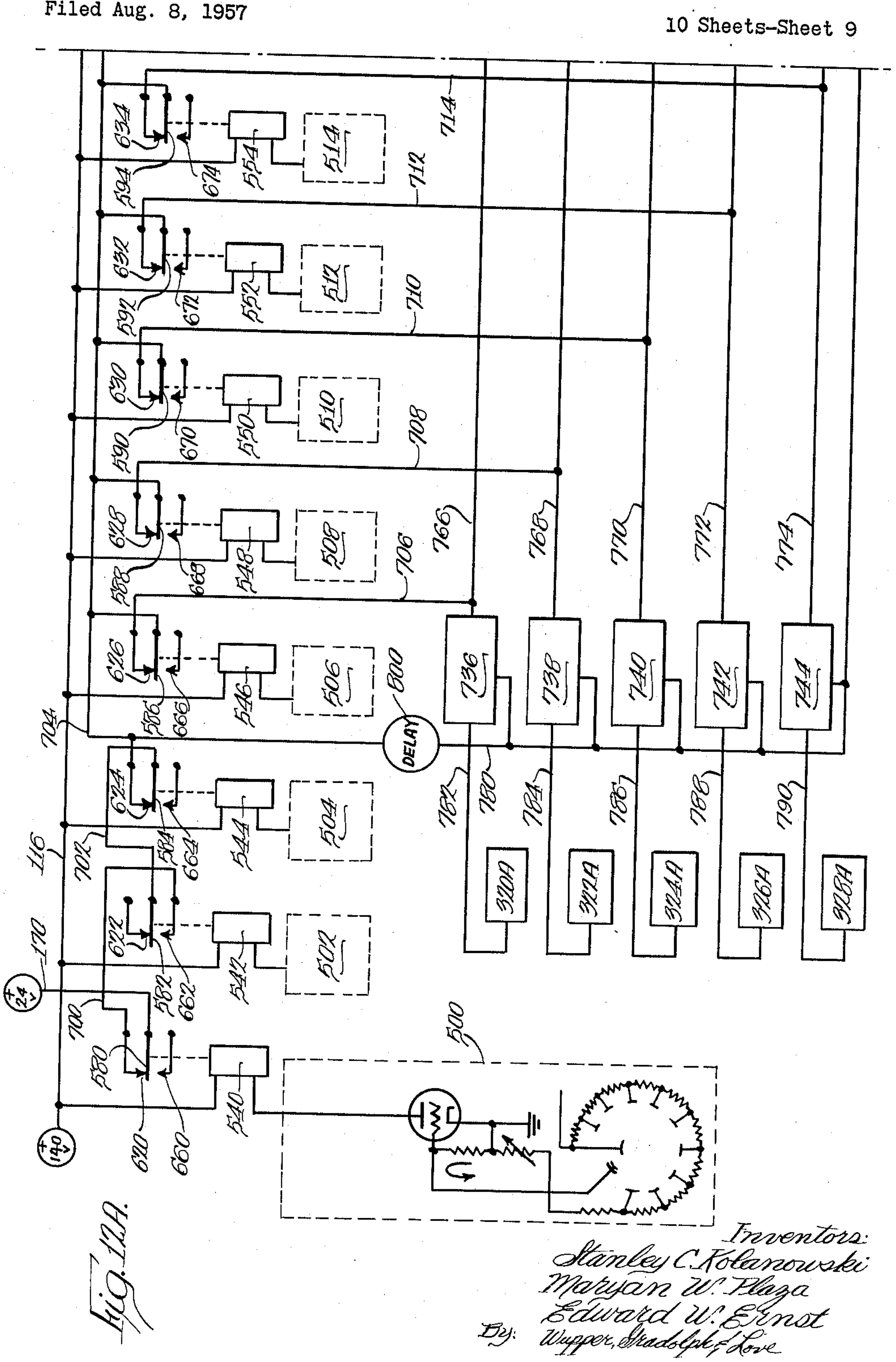

FIGS. 10A, B, C, and D is a circuit diagram of the major portion of the equipment illustrated in block form in FIG. 6;

FIG. 11 is a circuit detail in diagrammatic form which amplifies a portion of the block diagram of FIG. 10B; and FIGS. 12A and B is a circuit diagram of a portion of the equipment illustrated in block form in FIG. 2.

Figure 1:
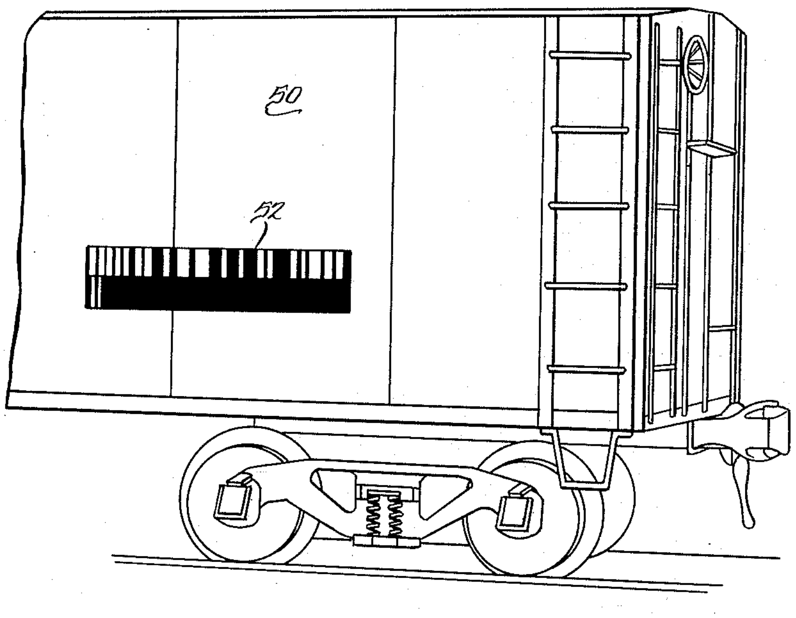
FIG. 1 is a diagrammatic representation of one end of a railway freight car, shown with a typical information panel thereon, the panel being coded according to teachings of the present invention.

Referring to FIG. 1 of the drawings, a freight car has been illustrated at 50 and needs no special description. An information panel 52 is shown as being attached to the side thereof in a relatively low position. This panel may be located in any desired position upon the car, but the position must be standardized from car to car so as to enable the reader, to be described presently, to find the panel and translate information therefrom without error. Physically the panel may most simply comprise a board painted, as indicated in greater detail in FIGS. 4 and 5, with black and white or other contrasting stripes according to the information to be coded thereon. The information panel as thus prepared is then attached to the car in any suitable fashion.

Figure 4:
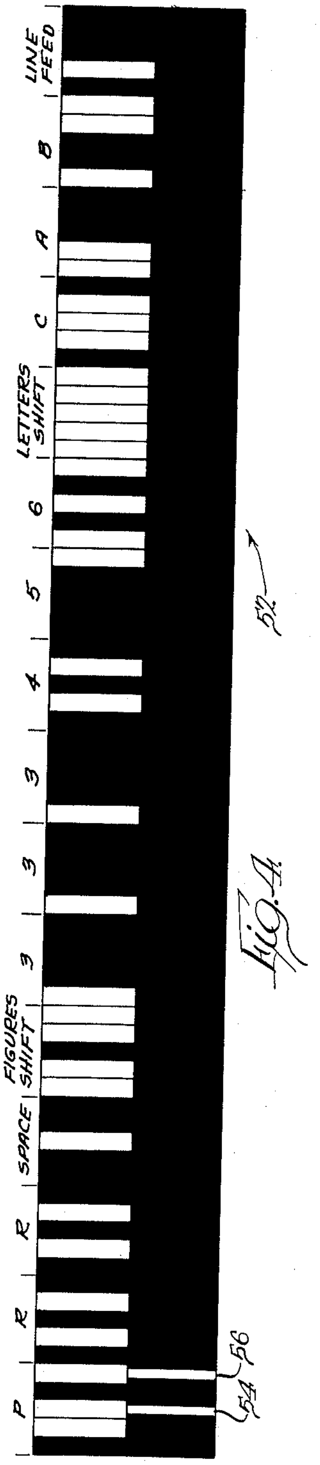
FIG. 4 is an illustration of a coded panel similar to that in FIG. 1, for instance, which has been arranged to convey typical information of the type contemplated by the present invention by application of the code of FIG. 3.
Figure 5:
FIG. 5 is an illustration of a different form of coded panel, this panel conveying the same information as the panel of FIG. 4 and being also based upon the code of FIG. 3.

Panels generally similar to those shown in FIGS. 4 and 5 may be used with either of the alternative systems to be described. However, for purposes of this application, the panels of FIGS. 4 and 5 have been especially adapted for the systems of FIGS. 6 and 2 respectively.

Figure 3:
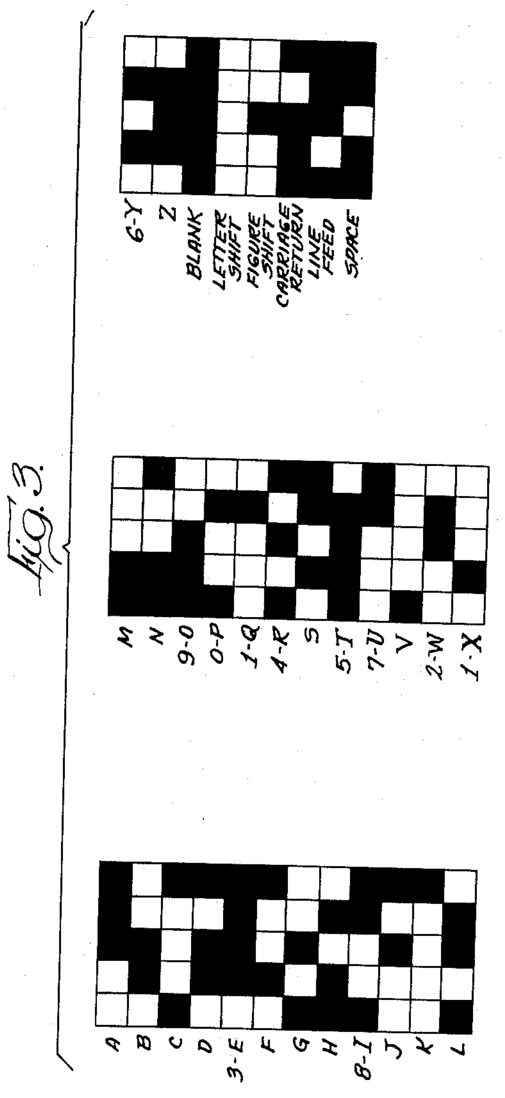
FIG. 3 is a table showing a suitable five place binary code for use in carrying out the present invention, this particular code being well known and comprising the standard Teletype or bident code as adapted for the particular purpose.

As shown in detail in FIG. 4, which illustrates a panel coded to contain typical information of the type contemplated, the upper row of stripes above the center line is arranged in groups of five according to the code of FIG. 3.

In FIG. 4 the first group of five stripes is in the order of black-white-white-black-white. From FIG. 3 it will be noted that this is the code representation for the letter P. The next group of five stripes is in the order black-white-black-white-black, which is the code for the letter R. The next group of five is a duplicate of the last and therefore also indicates the letter R. The letters P R R are followed by five stripes in the order black-black-white-black-black, which is the code symbol for a space or unused portion of the code. Thus the first four groups of letters identify the particular car as belonging to the Pennsylvania Railroad. Although only three spaces are needed to identify the Pennsylvania Railroad, four identifying spaces are provided on the panel because some railroads will need four code letters for their identification if all of the railroads in operation in the United States, Canada and Mexico are to be individually identified.

The fourth space in the code is followed by five stripes or bars in the order white-white-black-white-white, which is the symbol for figure shift. This is the arrangement used in the standard Teletype code system for indicating to a translator that the following group of symbols represents numbers rather than letters.

The figure shift symbol is followed by a five-bar design in the order white-black-black-black-black, which indicates the number 3. It will be noted that the panel provides space for six numbers which, as shown, are coded to represent in order the numbers three-three-three-four-five-six.

This provision for a six digit number is more than adequate to individually serial number all of the freight car and passenger cars owned or likely to be owned by any of the railroads.

The last of the numbers on the panel is followed by a five-bar design with the stripes in the order white-white-white-white-white. This is the Teletype code symbol for letter shift and informs the translating apparatus that the code symbols to follow are for letters rather than numbers. The next three five-stripe sections of the panel provide space for identifying the type of railway car. In the present instance the letters *c*, *a*, *b* are represented and identify the car as a caboose. Three letters are sufficient to identify all of the types of cars in railway use. The last portion of the panel, consisting of the five-bar design black-white-black-black-black, is the code symbol for line feed which informs the translator that the information about the particular car has been concluded and that the translator should shift or reset and prepare to record the information from the next following car.

Below the center line, the panel of FIG. 4 is all black excepting for two-spaced white stripes with a black stripe therebetween. This design of white-black-white is used for alignment purposes and tells the reading apparatus when the panel has arrived at such a position that it is to be read. In order to insure that alignment is precise, the white stripes 54 and 56 are only half as wide as the stripes in the upper portion of the design, and thus when these half width stripes are properly aligned for reading it is certain that those above in the coded portion of the panel are in precisely the correct position. The panel 52 may be of any convenient size but should be standardized. Conveniently, the panel can be twelve inches high so that each of the code stripes is six inches long and of a length such that each stripe is one inch wide. The reader is arranged to be sensitive to a small area, and is adjusted to read at a height occupied by approximately the central portion of the striped area. Thus, changes in loading of the car or sway as it passes the reader will not introduce errors, since the panel 52 may move upwardly or downwardly considerably with respect to the position of the reader, without changing the design as observed by the reader.

Figure 9:
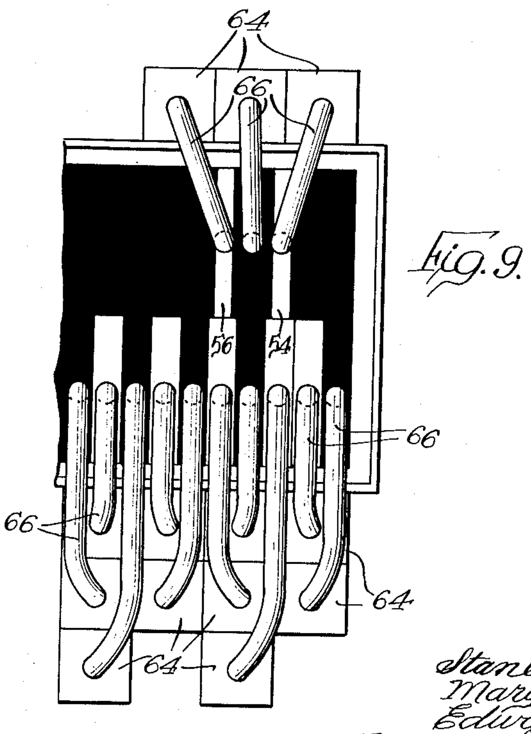
FIG. 9 is a view similar to FIG. 8, but illustrating the back of a reader adapted for operation in the type of system illustrated in FIG. 2.

In FIG. 2, the panel 52 is shown before a reader at 58. Essentially this device consists of a source of illumination as at 60, and an arrangement for forming an image of the panel 52 on the sensitive elements of a group of photoelectric cells. It consists of a lens 62 which may be the equivalent of a camera lens, although its quality of correction need not be as good as that found in most photographic cameras. This lens forms an image of the panel at its focal plane, and at the focal plane is a group of light-sensitive elements arranged in a pattern so as to coincide with the pattern of the panel image. As shown in FIG. 9, this can consist of a bank of photoelectric cells 64 conveniently positioned with bent rods 66 of methylmethacrylate arranged to conduct light from the focal plane image positions to the individual photocells. The panel arrangement of FIG. 4 as shown requires eighty photocells and light conducting rods to receive and translate the information from the coded top portion of the panel of FIG. 4 plus three more to receive the alignment information from the white stripes 54 and 56 and the intervening black stripe.

In FIG. 9 a portion of the information panel of FIG. 4 is shown as it would appear in the reader at the moment of reading. Because of the intervening lens 62, the image is inverted and reversed. It will be noted that the white stripes 54 and 56 and the intervening black stripe are in alignment with the light conducting rods 66 leading to the appropriate photocells. The three photocells at the upper portion of diagram 9, therefore, read white-black-white, which signals that the image of the coded panel is in position to be read. As will be explained presently, this triggers the apparatus to read the instantaneous light condition at each of the eighty photocells shown in the lower portion of the diagram. Reading from the right, therefore, to the place where the diagram is broken away in the interest of saving space, the group of photocells see in order, black-white-white-black-white-black-white-black-white-black, which is the first portion of the panel of FIG. 4 and includes the code information for the letters P and R.

The simultaneous type of reader described above, therefore, takes all information from the panel of FIG. 4 instantaneously. This requires a considerable duplication of equipment, but has the advantage that it is insensitive to the direction of movement of the car. Once the panel has been brought into alignment with the reader and is ready to be read, it makes no difference to the reader in which direction it is moving. The reader of FIGS. 7 and 8 which uses the information panel of FIG. 5, is simpler in that it requires only eight photocells for its operation rather than eighty-three. This is accomplished by reading the information from the panel character by character and accumulating the information until it has all been stored. Some complexity, however, is introduced by the fact that the information may be accumulated in either direction, depending upon the direction of movement of the car. It is necessary, therefore, to reorient the information before it is further processed.

The coded panel of FIG. 5 has four sets of stripes, labeled for convenience, from top to bottom, as A, B, C and D. Each of the stripe positions in the present example is six inches high and one inch wide, as in the panel of FIG. 4. Each character represented is two stripe spaces wide. With this presentation, each character which is four stripes high and two stripes wide is read simultaneously; and these two inch bands are read in succession from either end as the car moves past the reader. Although many types of coding may be used, that shown is as follows: Ignoring for the moment the first band at the left, labeled "Start" and taking the next band of two stripes labeled "P," this is so arranged that the first stripe in row B is white and of half width. The one directly thereabove in row A is black. The other stripe in row A is white and of half width. These three stripes correspond to the white-black-white stripes 54–56 of FIG. 4; that is, they are there to inform the reader when a character frame two stripes wide is in position to be read. The first stripe in row C is the first stripe of the five place code; and, since the letter P is represented, it is black, as is the first stripe to the left in FIG. 4. The one directly therebeneath in row D is the second place in the code and is white as is the second stripe of FIG. 4. The second stripe in row B represents the third place in the code and is white, as is the third stripe of FIG. 4. The one directly therebeneath—that is, the second stripe in row C—represents the fourth place in the code; and the one beneath this—that is, the second stripe in row D—is the last place in the code.

It will be noted that each two-stripe frame repeats the white-black-white design with half width white stripes, for the purpose of informing the reader that the particular frame is in position to be read, and that the remaining five stripes in the order given above are used as the code symbol. Comparison will indicate that the panel of FIG. 5, therefore, gives precisely the same information as the panel of FIG. 4. For convenience, the information given is indicated across the top of the panel.

At the left hand edge of FIG. 5, the first two-stripe design labeled "start" at the top has stripes in the order of black-white-white, where normally this position is occupied by the frame centering white-black-white design. The black-white-white arrangement, as will be explained in greater detail presently, informs the reader that the coded panel is being read at the left hand edge. At the right hand end of the panel, the last character position is occupied by stripes in the order of white-white-black. This informs the reader that it is scanning the right hand end of the card. Thus if the left hand or "start" signal is received before the right hand or "end" signal, the car is moving from right to left and the information is taken in the proper order; whereas, if the "end" signal is received first, the car is moving from left to right and the information will be reversed.

Figures 7, 8:
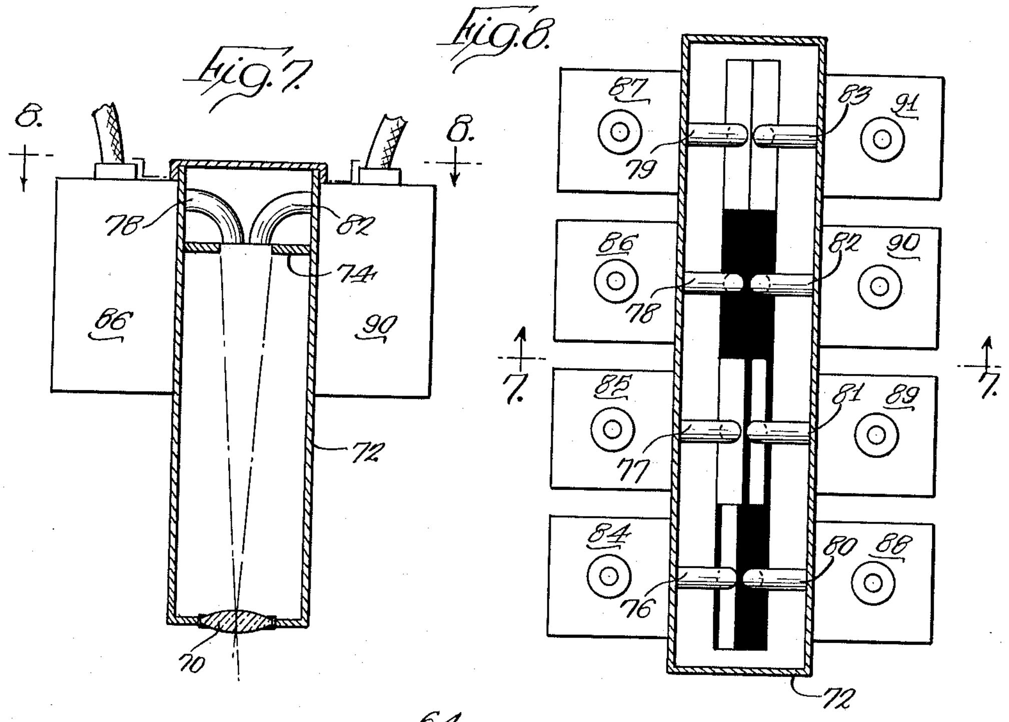
FIG. 7 is a diagrammatic horizontal sectional view through the reading instrument shown toward the left in FIG. 6.
FIG. 8 is a diagrammatic view of the back of the reader, shown with the cover removed as indicated by the arrows along the line 8—8 of FIG. 7.

The reader for the panel of FIG. 5 is illustrated in FIGS. 7 and 8 and is simpler than that of FIG. 9, since it requires only eight photocells, which may be arranged as shown. Here a lens 70, in a light-tight housing 72, brings the image of the panel into focus at a focal plane 74. Appropriately bent rods formed of methylmethacrylate have their ends properly positioned at the focal plane. These rods are indicated in FIG. 8 by the numerals 76 to 83 inclusive. At their opposite ends these rods lead into photocell housings indicated, respectively, at 84 to 91. By comparing FIG. 5 with the inverted and reversed image shown in FIG. 8, it will be seen that at the instant shown, the reader is scanning the symbol for the letter P as follows: Photocells 84, 88, and 89, are observing the white-black-white design which indicates that a frame is in position to be read. Cells 90, 91, 85, 86 and 87 observe, respectively, black-white-white-black-white or the symbol for letter P.

In both the readers of FIGS. 7 and 8 and FIG. 9, it is possible to arrange the individual photocells directly at the focal plane and dispense with the light conducting rods if desired. With this arrangement we prefer to use photosensitive junction transistors such as the Clarex type CL2 solid state photocell for instance. The use of junction transistors ordinarily is to be preferred since the mechanism is simpler and less costly than the arrangement shown. The system illustrated using photo-multiplier tubes of the 931A type, may have an advantage in some instances, however, where a very high order of sensitivity is desired.

Referring now to FIG. 10A of the drawings, the photo multiplier tube is shown at 81 and may be considered as of type 931A for instance. It is connected through a conventional triode D.C. amplifier to an output lead 100. The triode normally conducts. However, when a white stripe is detected, the multiplier tube 81 conducts to negatively bias the triode below cutoff; and the triode ceases to conduct.

The other identical phototube and amplifier circuits are shown in boxes labeled 80, 84, 82, 83, 85, 86 and 87 having output leads indicated, respectively, at 102, 104, 106, 108, 110, 112 and 114. Each of these leads is connected to a B-plus power line 116 through its own relay coil, these coils being indicated from the left by the numerals 118, 120, 122, 124, 126, 128, 130, and 132. Each of these coils operates one or more sets of contacts, and for convenience all of the contacts are shown in the positions they assume when the photocells are illuminated and hence the relay coils are deenergized.

Specifically, relay coil 18 operates a movable contact 136 which is associated with contact 138 when the coil 118 is deenergized. Energization of the coil 118 opens the circuit through contacts 136–138. This coil also operates a movable contact 140 which makes a circuit through contact 142 when the coil 118 is deenergized, and through a contact 144 when the relay is energized by sufficiently reducing the light falling upon the photocell at 81. Contacts associated with relay coil 120 are as follows: Energization of this coil makes a circuit between relay contacts 146 and 148, this circuit being opened upon deenergization of the coil 120. Two other sets of contacts at 150 and 152 are normally closed, circuits through these contacts being opened upon energization of the coil 120.

Normally closed relay contacts 154 are opened upon energization of relay coil 122 as are normally closed contacts 156. A set of normally open contacts at 158 close when relay coil 122 is energized. Relay coils 124, 126, 130 and 132 each operate, when energized in such fashion, to open, respectively, sets of normally closed contacts at 160, 162, 164, 166 and 168.

A relay operating voltage, +24 volts for instance, is connected to lead 170. This lead is connected in turn to the movable relay contacts 136 and 140. Relay contact 138 is connected by a lead 172 to contact 148. Contact 146 is connected to one of the contacts 154, the other being connected to a bus 176. This bus is also connected to one each of the contacts of sets 160, 162, 164, 166 and 168, the other contacts in the sets being connected, respectively, to leads 178, 180, 182, 184 and 186.

Contact 142 is connected to one of the contacts in the set 152, the other contact in this set being connected to one of the contacts in the set 158 and the other in this set being connected to a lead 188. Contact 144 is connected through contacts 140 and 156 in series, to a lead indicated at 190.

Analysis of the above circuit shows that when photocells in the circuits of 81, 80 and 84 are observing stripes which are white-black-white in that order, relay coil 118 will be deenergized, coil 120 will be energized, and coil 122 will be deenergized. Under these conditions relay power lead 170 will be connected through contacts 136–138, contacts 148–146 and contacts 154 to line 176 thereby energizing this line and one of the contacts in each of the sets 160, 162, 164, 166, and 168 so that this voltage will appear in the output leads 178, 180, 182, 184 and 186 whenever the photocells 82, 83, 85, 86 and 87 are illuminated. Thus, the white-black-white pattern on the cells 81, 80 and 84 energizes the output leads 178 to 186 whenever the photocells operating these outputs is observing a white line, but in those instances where a particular photocell is observing a black line, its output lead will be deenergized.

Whenever the cells 81, 80 and 84 in that order observe a black-white-white pattern, the relay power lead 170 will be connected through contacts 140–144 and contacts 150 and 156 in series to the lead 190 which is therefore energized whenever the "start-of-information" frame at the left hand edge of FIG. 5 is in front of the reader. Similarly, when the cells 81, 80 and 84 in that order observe the pattern white-white-black, the relay voltage line 170 will be connected through contacts 140–142 and contacts 152 and 158 in series, to lead 188, thereby energizing this lead whenever the "end-of-information" frame at the right hand end of FIG. 5 is before the reader.

The storage circuit for the information is shown diagrammatically in FIG. 10B where it will be observed that each of the information leads 178, 180, 182, 184 and 186 enter from the left. The lead 176, which is supplied with a pulse for each frame of information, also is shown and is connected through a delay circuit 200 to a shift pulse conductor 204. The delay circuit at 200 can be of any suitable type; its function merely is to receive a pulse on the input side simultaneously with energization of relays 124, 126, 128 and 132 and to insure that all of these relays have had time to operate and restore before a pulse appears in the lead 204.

The signal input lead 178 is connected to a box 206 which is one unit of an information matrix which is shown in greater detail diagrammatically in FIG. 11. Here it will be seen that energization of the lead 178 operates to polarize a magnetic ring 208 in one direction. A pulse in the lead 204 has the effect of polarizing the ring 208 in the opposite direction. A third coil 210, wound on the core 208, supplies an output circuit connected through a diode 212 and lead 214 and thence through a delay circuit 216 to output leads 218. These leads are connected in turn to the next stage, which is identical to the one shown. A diode 220 is also connected across the input to the delay circuit 216. This circuit operates as follows: A pulse in the shift pulse conductor 204 polarizes the ring 208 in one direction. If, now, a pulse is supplied by way of the lead 178, the ring 208 is polarized in the opposite direction. This change in polarity tends to send a voltage pulse through the output coil 210, but this is stopped by the diode 212. The next resetting pulse in the lead 204, however, reverses the polarity once again, and this produces an output pulse through the delay circuit 216 so as to shift the information from the memory stage shown to the next in the series. On the other hand, if the ring 208 has been polarized by a pulse in the lead 204 and then the next shift pulse is applied to the lead 204 without any intervening pulse on the lead 178, the polarity of the ring 208 is unchanged and therefore no pulse appears in the output circuit coil 210.

The diode 220 prevents feedback of a pulse from the succeeding stage to the coil 210. More specifically, when a shift pulse reverses the ring polarity in the succeeding stage 230, a pulse is produced in the input coil of stage 230. The pulse so produced is of a polarity such that the positive potential is at the bottom of the coil. Diode 212 is polarized to accept this pulse, but diode 220 will shunt the pulse.

In the circuit of 10B, the information from one frame of eight stripes, such as the letter P in FIG. 5 for instance, is transferred through the lines 178, 180, 182, 184 and 186 and stored in the matrix elements 206, 222, 224, 226 and 228, all of these being duplicates of the one shown at 206 in FIG. 11. After a short delay established by the circuit at 200, a pulse appears in the lead 204 and shifts the information to the next stage shown at 230, 232, 234, 236 and 238. The first stage at 206, 222, 224, 226 and 228, is therefore stripped of information and is prepared to receive that contained in the next eight bar segment of the panel shown in FIG. 5. As successive information frames are brought into position to be observed by the photocells the information is shifted from stage to stage until the first information received is transferred to the last of the stages indicated at 240, 242, 244, 246 and 248. Although only three stages are shown in FIG. 10B, it will be appreciated that the number of stages required is equivalent to the number of information frames on the coded panel plus one. In the present instance this amounts to 17 stages.

Once the matrix is full of information, it can be shifted out a stage at a time from the last stage 240, 242, 244, 246 and 248 by applying additional shift pulses to the line 204, these output lines being represented in order by the numerals 250, 252, 254, 256 and 258.

As previously explained, depending upon the direction of travel of the car past the reader, the information may be in the matrix in the proper order, or it may be reversed. In order to accommodate for this situation, a second memory matrix is supplied and is indicated generally by the numeral 260. It is substantially like the first excepting that information is not read into it a letter or character at a time, but rather transferred thereto all at once; and it therefore can have one less stage than the initial matrix. The stages in the second or number 2 matrix are interconnected as are those in the first matrix, excepting that, when shifting pulses are supplied to the line 204, the information travels through the matrix toward the left rather than toward the right. The output leads which correspond in order with leads 250, 252, 254, 256 and 258, are therefore leads 270, 272, 274, 276 and 278. For convenience, the leads having the same information are shown paired at the right hand edge of FIG. 10B.

Shifting of the information from the main register or matrix to the second register at 260 is accomplished by interconnecting each stage of the main register, except the input stage, with a corresponding stage of the second register. The matrix element 230, for instance, is connected through an "and" circuit 280 to the input lead of an appropriate matrix element, 282 for instance, of the second matrix. The "and" circuit 280 is arranged to transfer the information from matrix 230 to 282 when a lead 284 connected to the "and" circuit is energized. These "and" circuits may be of any conventional type, such as relays for instance.

Thus the information can be fed into the lower matrix a stage at a time until the matrix is full, the last frame of information received being stored in the second stage at 230, 232, 234, 236, and 238. Thereafter a potential on the lead 284 along with a shift pulse in lead 204 will shift this information simultaneously to the second storage matrix. Thereafter, shift pulses applied to the lead 204 will shift information from the second register 260 with the last to be received being the first to be read out.

Figure 10C:
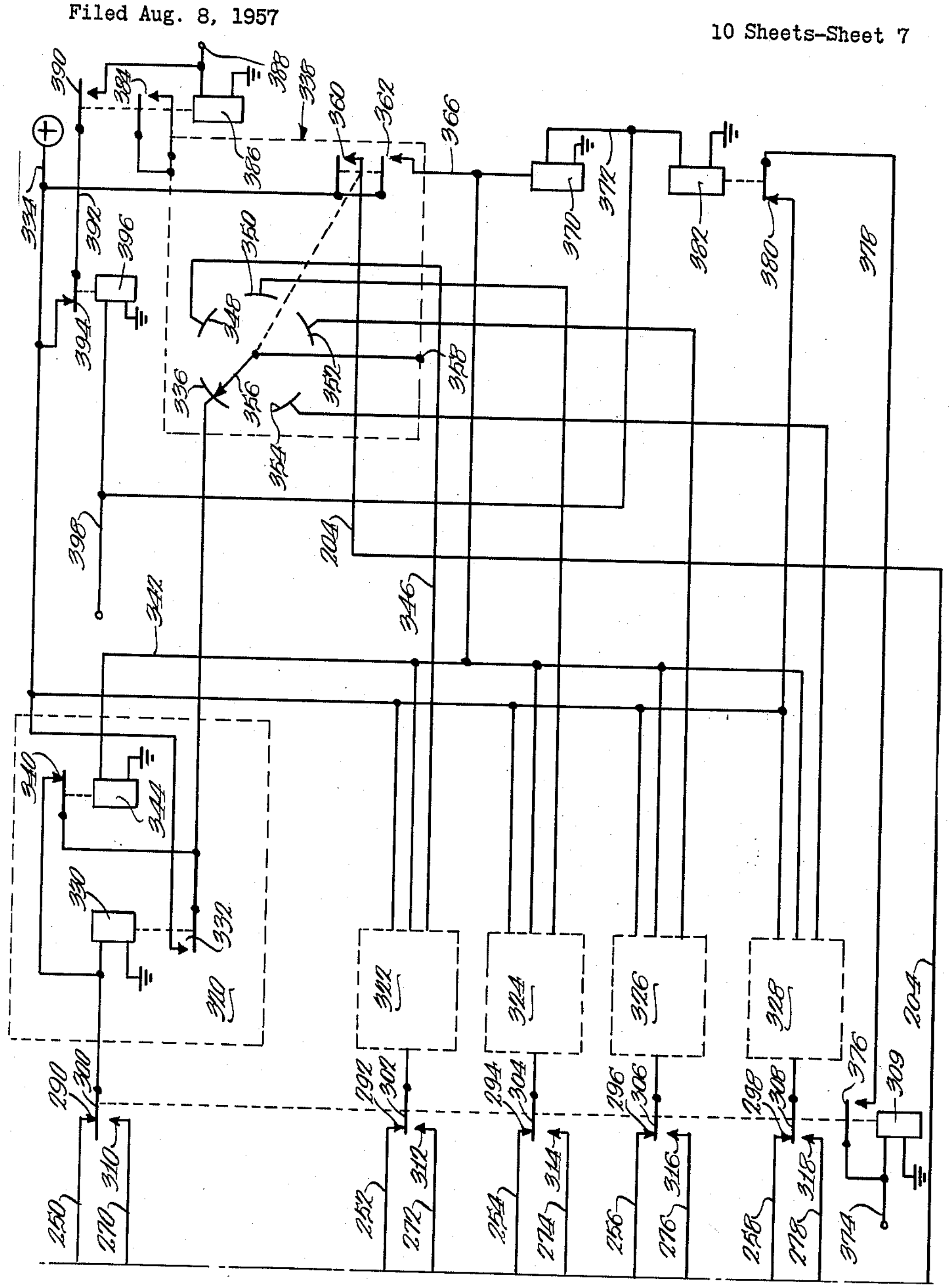

Referring now to FIG. 10C, the paired outlet leads from the circuit 10B are shown at the left. Each of the leads 250, 252, 254, 256 and 258 is shown as being connected to a fixed relay contact, these contacts in order being indicated by the numerals 290, 292, 294, 296 and 298. Each of these contacts is normally engaged by a movable relay contact 300, 302, 304, 306, and 308, respectively. These movable contacts are ganged together to be operated by a relay coil indicated at 309. Whenever this coil is energized, the circuit through contacts 290, 292, 294, 296, and 298 is opened and contacts 300, 302, 304, 306, and 308 engage, respectively, a second set of contacts 310, 312, 314, 316, and 318.

Each of the movable relay contacts 300, 302, 304, 306 and 308 is connected into a code relay circuit, these circuits being indicated generally in order by the numerals 320, 322, 324, 326 and 328. Thus, the leads 250, 252, 254, 256 and 258 from the first matrix are connected through contacts, respectively, 300, 302, 304, 306 and 308 when the relay coil 309 is deenergized, so as to feed into the code relays at 320, 322, 324, 326 and 328. On the other hand, if the relay 309 is energized, the contacts 300, 302, 304, 306 and 308 are shifted so that the information fed into the code relays is from the leads 270, 272, 274, 276 and 278, which originate at the second or reversing matrix.

The code relays are all identical; and only one, therefore, needs to be explained. As shown at 320, the input lead from the relay terminal 300 is connected through a relay coil 330 to ground. Whenever relay coil 330 is energized, it closes a set of contacts 332, which connect a relay power lead 334, maintained at 24 volts for instance, with one of the input terminals 336 of a standard high speed parallel to sequential Teletype transmitter indicated generally by the numeral 338.

Whenever the contacts 332 are closed, this also establishes a holding circuit for the relay coil 330 by way of relay contacts 332 and a set of normally closed relay contacts 340 connected to the coil 330. Contacts 340 are adapted to be opened momentarily whenever a pulse is applied to a line 342 connected to a relay coil 344 which operates contacts 340. Thus a pulse entering the code relay from the last stage of one of the registers by way of contact 300 acts to close contacts 332 and energize one of the parallel input transmitter terminals 336; and these relay contacts 332 remain closed until a pulse is subsequently applied to the lead 342 after transmission of a character as will be described below.

Code relay 322 has its output lead 346 connected to Teletype transmitter terminal 348, while similarly the output leads of code relays 324, 326 and 328 are connected to transmitter input terminals 350, 352 and 354. The transmitter sweep 356 for each revolution supplies a pulse to the transmitter output lead 358 each time it strikes one of the contacts 336, 348, 350, 352 and 354 which is energized. In any particular location, therefore, an output pulse, or a lack of one, depends upon the information last taken from the storage matrix and entered into the code relays 320, 322, 324, 326 and 328.

After the transmitter sweep 356 has completed a revolution and has sequentially transmitted all of the information for one character, a cam on the sweep shaft momentarily closes contacts at 360, and a similar set at 362. One of the contacts at 360 is connected to a relay operating power line 334, while the other is connected to the previously mentioned shift pulse conductor 204. One of the contacts of the set 362 is also connected to the power line 334, the other contact in this set being connected to a lead 366 connected in turn to the circuit holding relay line 342. Thus, each time the sweep 356 completes sending the information from the last code relay set at 328, contacts 362 are momentarily closed, thereby energizing leads 366 and 342 which energizes the holding circuit relay 344 thereby opening the contacts 340 so as to deenergize the relay 330, with the result that contacts 332 open and condition the code relay to receive additional information from the input lines at the left of FIG. 10C. This action simultaneously takes place in the other identical code relays 322, 324, 326 and 328.

The pulse lead 366 is also connected through a conventional counter at 370 which accumulates a count to 16 and then supplies a pulse to an output lead 372. It follows, therefore, that since each revolution of the transmitter sweep 356 transmits one character, and since there are sixteen characters on the coded panel, a pulse will be supplied to the lead 372 after all of the information has been transmitted from one code panel and the system is to be conditioned to read the panel on the next car in line.

The relay coil 309, previously mentioned, is energized by way of a lead 374. When energized, it shifts the contacts 300, 302, 304, 306 and 308 as previously mentioned. This is to be accomplished when the information has been fed into the number 1 matrix in a backward direction. When coil 309 is energized, it also closes a set of contacts at 376. These contacts are connected between the lead 374 and a holding circuit line 378 connected through a set of normally closed relay contacts 380 to the relay power line 354. The contacts 380 are connected to be opened whenever a relay coil 382 is energized, and this coil is connected to be energized by the lead 372. Thus when a pulse is supplied through the lead 374, indicating that the information in the relay matrix is backward, relay 309 is energized and closes contacts 376 which establishes a holding circuit maintaining this relay in energized condition until all of the information has been taken from the relay matrix. After this has been accomplished, the counter-circuit at 370 will supply a pulse to the lead 372 which energizes relay coil 382 thus separating contacts 380 and interrupting the holding circuit, thereby permitting relay coil 309 to become deenergized. Thus, as each information panel approaches the reader, the reader assumes that the panel will come before it traveling from right to left. If the reader determines that this is not so, the system automatically accommodates for the reversal of the information, but drops back to the original condition after the information from that particular panel has been transmitted.

The standard Teletype transmitter 338 has a set of start-stop contacts indicated at 384. These contacts are connected into the transmitter circuit in such fashion that the transmitter operates whenever these contacts are closed and stands by when the contacts are open. These contacts are normally open, but are closed by a relay coil 386 when energized. After all information from one panel has been stored in the main register, the coil 386 is energized by way of a lead 388 connected into the circuit of FIG. 10B and is held energized by way of relay holding contacts 390 which are normally open, but are arranged to be closed by coil 386 when energized. The circuits causing the operation of coil 386 will be described below. The holding circuit of the coil 386 extends through contacts 390, lead 392, and a set of normally closed relay contacts 394 to the relay power line 334. Relay coil 396 separates contacts 394 when energized by way of lead 398 connected to the line 372 which receives a pulse at the end of transmission of the information on each car.

If, therefore, the lead 388 is energized, contacts 384 will be closed so as to start operation of the transmitter, and contacts 390 will close, thereby establishing a holding circuit so as to keep relay coil 386 energized. After the completion of transmission of the sixteen characters involved in the message, a pulse will appear in the line 372 and by way of lead 398 will energize relay coil 396, thereby separating contact 394 so as to interrupt the holding circuit for relay coil 386, thereby placing the Teletype transmitter in standby condition.

Figure 10D:
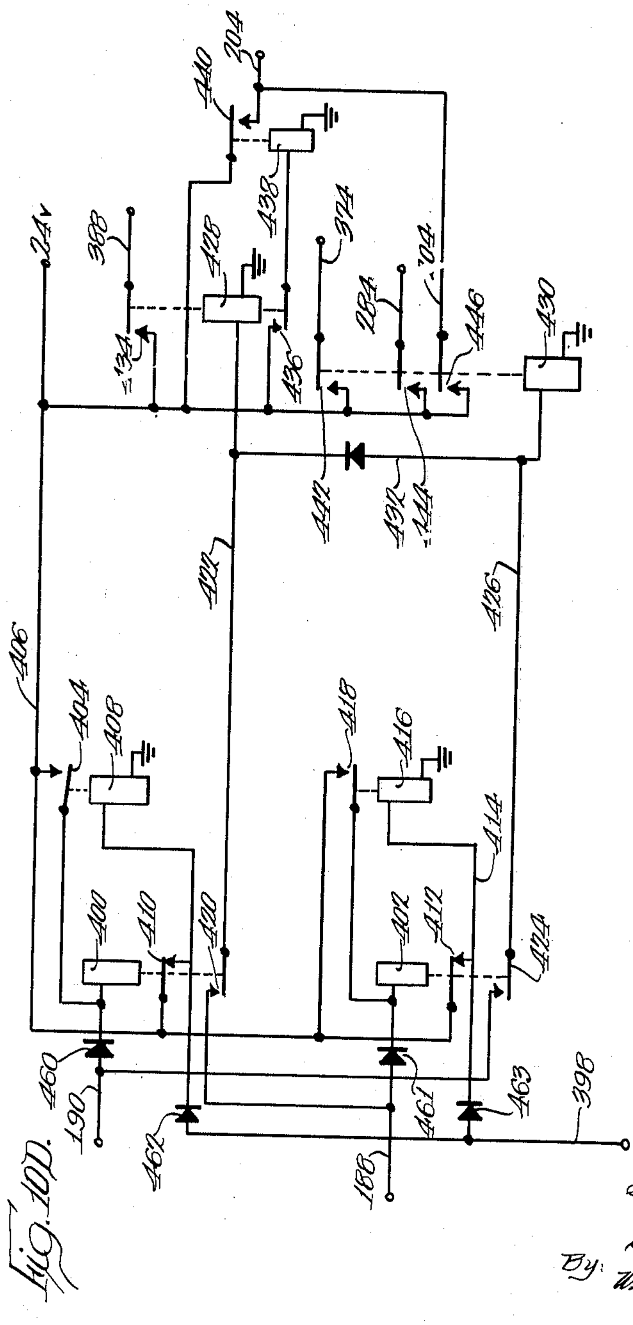

Referring now to FIG. 10D, it will be noted that the line 190 when energized actuates a relay coil 400 by way of a feedback preventing diode 460. This lead it will be remembered is from FIG. 10A and is energized whenever the black-white-white design at the left hand edge of FIG. 5 is before the reader. Similarly, the lead 188, energized when the end design of white-white-black is before the reader is connected to energize its relay coil 402 by way of a feedback preventing diode 461. Coil 400 is also energized by way of normally closed holding contacts 404 connected to a 24 volt relay operating line 406. Contacts 404 are opened whenever relay coil 408 is energized. This coil is connected, by way of a feedback preventing diode 462, to lead 398 previously mentioned in connection with FIG. 10C as receiving a pulse at the end of transmission of the entire intelligence from a coded panel.

Relay coil 400 operates when energized to open a set of normally closed contacts 410 connected between the lead 398 and the relay power supply lead 406. Thus when relay coil 400 is deenergized, contacts 410 are closed, thereby supplying energy to relay coil 408. Energization of this coil maintains contacts 404 separated so that relay coil 400 stays deenergized until a pulse arrives through the lead 190. This momentarily energizes coil 400 and opens contacts 410. Coil 408, therefore, becomes deenergized and permits contacts 404 to close, thereby establishing a holding circuit for coil 400, with the result that contacts 410 are maintained in separated condition until a pulse arrives by way of the lead 398. Such a pulse momentarily energizes coil 408 and resets the cycle.

Lead 188 is connected to relay coil 402, and this coil when energized separates contacts 412 which are connected between the relay energizing line 406 and the branch 414 from lead 398 to relay coil 416. This latter coil, when energized, operates to open contacts 418 in a circuit between relay power line 406 and coil 402. This arrangement it will be appreciated is a duplicate of the one described above and operates in such fashion that a pulse in the lead 188 energizes coil 402 which remains energized until a pulse arrives by way of the lead 398 and a feedback preventing diode 463 to deenergize coil 402 until the following pulse is applied to lead 188.

Coil 400 also operates when energized to close normally open contacts 420 connected between line 188 and lead 422. Similarly, normally open contacts 424 are connected between lead 190 and lead 426, contacts 424 being closed whenever relay coil 402 is energized. Lead 422 is connected to relay coil 428, while lead 426 is similarly connected to relay coil 430, leads 422 and 426 being interconnected through a diode 432 so oriented that energization of line 422 energizes relay 428 only, whereas energization of lead 426 operates to energize both relay coils 428 and 430.

The circuit is such that if a pulse arrives by way of the lead 190, contacts 420 are closed and maintained closed so that subsequently if the coded panel is passing the reader from right to left, indicating that the information is in the proper order, lead 188 will subsequently be pulsed when the last frame on the panel registers with the reader. This pulse travels by way of contacts 420 and energizes lead 422. On the other hand, if a pulse arrives by way of the lead 188 first, it energizes relay coil 402, thereby closing contacts 424 so that subsequently, when a pulse arrives by way of the lead 190 it is conducted by way of contacts 424 to lead 426 and thence to relay coils 430 and 428 simultaneously.

Energization of relay coil 428 closes contacts 434 connected between power lead 406 and line 388 of FIG. 10C. It will be remembered that, as described above, a pulse on line 388 operates the relay coil 336 to start the transmitter 338. Thus receipt of both the start and finish signals from the panel of FIG. 5 acts to start operation of the Teletype transmitter, since the receipt of both of these signals is an indication that all of the information has been stored within the memory system. Energization of coil 428 also closes contacts 436 connected between power line 406 and relay coil 438. Energization of coil 438 closes contacts 440 connected between the power line 406 and shift pulse lead 204 of FIG. 10B. Thus the receipt of both the start and finish code information, after a time delay introduced by the time of operation of the relay 438, introduces a shift pulse which shifts the information stored in the last group of memory units in the matrix 240, 242, 244, 246 and 248, for instance, into the code relays.

If in addition to the above, relay coil 430 is also energized, indicating that the information is stored in the number one matrix backward, relay coil 430 operates to close contacts 442, which energizes lead 374 of FIG. 10C. This energizes relay coil 309 previously described, which shifts relay contacts 300, 302, 304, 306 and 308 so that the information is read into the code relay from the No. 2 information storage system.

Energization of coil 430 also closes relay contacts 444 connected between power line 406 and line 284 of FIG. 10B. Reference to this circuit will show that this lead comprises one side of the "and" circuits interconnecting the No. 1 storage with the No. 2 storage. Relay coil 430, when energized, also closes a third set of contacts 446 connected between the power lead 406 and the shift pulse lead 204 which operates in FIG. 10B to shift information one stage toward the right in the storage matrix of the No. 1 storage.

With battery potential applied to conductor 284 of the "and" circuits such as circuit 280, the shift pulse will transfer the information from the main storage to the No. 2 storage in a well known manner. Therefore, when the information has been taken from the information panel in a reverse direction, relay 430 will shift the information one stage to the right out of each of the matrix units of the No. 1 storage and thence by way of the "and" circuits, 280 for instance, to the No. 2 storage; and, after a short time delay provided by the sequential operation of relays 428 and 438, another pulse will be supplied to the No. 2 storage which will shift the information one stage from the No. 2 storage toward the left into the code relays.

In general, therefore, and with reference to FIG. 6, information picked up from the card or panel of the type shown in FIG. 5 is sensed two bands at a time, and this information is transmitted by way of the photocell system of FIGS. 7, 8 and 10A to the No. 1 storage which forms the subject matter of the lower portion of FIG. 10B, from which it is shifted character by character to the right. This process continues until the No. 1 storage is full and all of the information has been taken from the panel. At this juncture, the detection and control circuit of FIG. 10D operates relay contacts which connect the output either of the No. 1 storage, or alternatively the output of the No. 2 storage, to the code relays. Also if the detection and control circuit determines that the information is in the No. 1 storage in a backward condition, the transfer gate is actuated to shift the information to the No. 2 storage so that it can be read out in the reverse direction. The information from either the No. 1 or the No. 2 storage, therefore, is fed into the code relays, one character at a time, and is shifted from the code relays to the information sequential transmitter which is started and stopped through operation of the detection and control circuit and which feeds back signals to the code relays and the storage system to advance new information as old information is taken from the information transmitter.

From there on, the information in line 450 for instance, being in standard Teletype code and sent by standard Teletype equipment, is acceptable by many types of compatible devices such as Teletype printers, card punches, tape punches, and so on. Because the speed of operation of the system should be high enough to accommodate information taken from moving railway cars at speeds up to one hundred miles an hour, or so, it is preferable if the information transmitter reads directly into a tape punch or other high speed permanent storage system from which it can be taken at leisure and used for punching cards or for other purposes.

As is well known, the "line feed" character of FIG. 5 is used in Teletype systems to separate succeeding messages, etc.

A variation of the above described system based upon simultaneous reading of all of the coded information, that is, the system of FIGS. 2, 4, 9, 12A and 12B, is essentially similar to the character by character system, but differs principally in that all of the information from the reader is simultaneously put into the storage matrix in a parallel manner, and once therein is always in the proper order.

It therefore always can be taken from one end of the matrix serially without provision for reversing the information prior to this operation. The No. 2 matrix is therefore not necessary and some of the control equipment (that of FIG. 10, for instance) can be omitted from the circuit.

It will also be noted that, since all information is read from the card simultaneously, the code stripes can be arranged in any arbitrary manner on the card. Obviously, the photocells in the reader must be correspondingly arranged.

Referring now to FIGS. 12A and B, a photocell and amplifier is shown within the box 500. This is identical to the arrangement indicated at 81 in FIG. 10A; and, as previously described, any suitable photoelectric device can be used, such as a photo multiplier tube or a junction transistor, for instance, depending upon the preference of the manufacturer and upon the sensitivity desired. Other photocells and amplifiers are indicated by even numbers from 502 to 534. All of these units are identical and each is placed to read a stripe on the panel of FIG. 4, the first three, that is, 500, 502 and 504, being in a position to sense the frame position bands 54 and 56 and the dark band therebetween. Specifically with respect to FIG. 4, the photo-sensitive units 506 to 514 sense the letter P, from 516 to 524 the first letter R, and 526 to 534 the last character, "line feed," the circuits which sense the region beyond the first letter R and through the last letter D being omitted from the drawing in order to conserve space.

The photo-sensitive units 500 to 534 operate relay coils numbered, respectively, by even numbers from 540 to 574. Each of these coils operates a single pole, double throw, set of relay contacts numbered, respectively, as follows: The movable contacts are indicated in order by the even numbers from 580 to 614, the contacts which are normally closed against the movable contacts by the numbers 620 to 654. The contacts which are normally open and are closed against the movable contact when the coils are energized, are numbered in succession by even numbers from 660 to 694. With the exception of contact 662, the latter group are unconnected and act simply as stops.

As in the embodiment illustrated in FIG. 10A, the ends of the relay coils 540 to 574 not connected to the photocell amplifiers are connected to a B+ line 116, so that conduction through the photocell units brought about by the presence of a black stripe, causes energization of the solenoids and a consequent shifting of the movable relay contacts.

A line 170 carrying a relay operating voltage of 24 volts or so is connected to the movable contact 580, and the contact 620 against which it is normally closed is connected by a lead 700 to contact 662. The movable contact associated therewith, 582, is connected by a lead 702 to movable relay contact 584; and the contact 624 against which contact 584 is normally closed is connected to a pulse line 704. This arrangement, it will be noted, like that of FIG. 10A results in the line 704 receiving a pulse whenever photocell units 500 and 504 observe a white stripe at the same time as a black stripe is before photocell unit 502.

The pulse lead 704 is connected to each of the movable relay contacts from 586 to 614. Each of the normally closed fixed relay contacts from 626 to 654 are connected to output leads numbered successively from 706 to 734. These leads, as in the previous instance, go to the memory matrix illustrated along the bottom half of FIGS. 12A and 12B.

The matrix consists of five parallel channels with each channel in the present instance having sixteen stages in series. In order to avoid complexity, only three stages in series are shown in each of the parallel branches. The five stages in parallel at the output end of the matrix are indicated by the numerals 736, 738, 740, 742 and 744. The next group of five are indicated in order by the numerals 746 to 754, and the last group by the numerals 756 to 764. The individual first and second units in each of the series branches are connected together by lines 766 to 774. Similar leads 776 to 784 extend from the unit 746 to 754 to the next in line, while the last units 756 to 764 are connected in turn to the previously mentioned leads 726 to 734. Also leads 716 to 724 are connected in turn to the matrix interconnecting leads 776 to 784, respectively, and leads 706 to 714 are connected to matrix leads 766 to 774.

Thus whenever the photo-sensitive units 500, 502 and 504 sense the triggering stripes 54, 56 and the intervening black stripe, the lead 704 will receive a pulse which will pass through appropriate relay contacts of the individual stripe sensing photocell circuits wherever a particular photocell is observing a white stripe, with the result that its associated matrix unit will receive and store this information. As an example, if the photocell unit 506 observes a black stripe, this energizes coil 546 which opens contacts 586—626 with the result that no pulse is received by the storage unit at 736. If at the same time, photocell unit 508 is observing a white stripe so that coil 548 remains deenergized, then the pulse will appear from lead 704 by way of contacts 628—588 to lead 708 and line 768 so that this information is stored in the matrix element 738.

Thus all of the information from all of the photocell circuits representing all of the stripes on the coded panel, is set into the information storage matrix simultaneously. When a pulse appears in the lead 780, this lead being connected to the shift circuit of each of the units in the matrix, the information advances toward the left so that one pulse causes the information to read out from the matrix 736, 738, 740, 742 and 744 into leads 782, 784, 786, 788 and 790, which are the counterparts of contacts 300, 302, 304, 306 and 308 of FIG. 10C, which lead into the code relays. From here on the circuit is substantially the same as FIG. 10C.

Figure 12B:
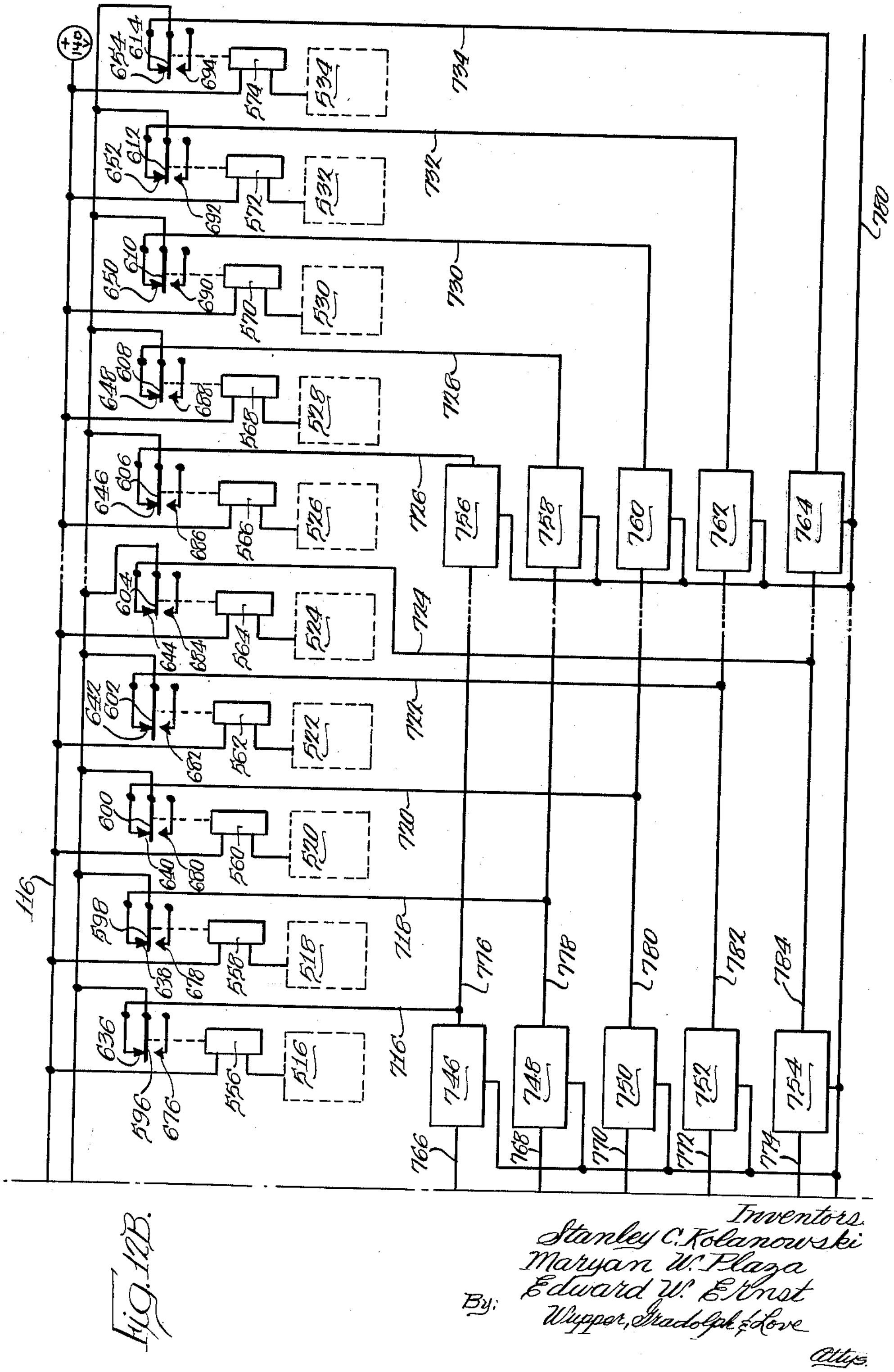

As with FIG. 10C, operation of the teletype transmitter at 338 sends pulses into lead 204 which may be considered as connected to lead 780 of FIGS. 12B and 12A. That is, this lead is connected to each of the matrix elements and acts to advance the information toward the left in the matrix, or from the last stage at 736 to 744, whenever this lead is pulsed. Lead 704 is also connected through a delay circuit 800 to lead 780, so that shortly after the information is stored in the matrix, that in the first stage is shifted out to the code relays to start the transmitting cycle. Lead 780 of FIG. 12 is also connected to terminal 388 of FIG. 10C, so that the transmitter is placed in operation when the first frame of information has been shifted to the code relays.

While we have shown and described particular embodiments of our invention, it will be aparent to those skilled in the art that numerous modifications and variations may be made without departing from the underlying principles of the invention. We therefore desire, by the following claims, to include within the scope of the invention all such modifications and variations by which substantially the results thereof may be obtained by substantially the same or equivalent means.

We claim:

1. Apparatus for transmitting, detecting and recording intelligence between railway cars and a fixed station as said cars move past a pickup device at any normal operating speed comprising: a panel forming a portion of each car; code markings distinctive of certain intelligence on each said panel, said code markings comprising photo differing elements positioned on said panel in successive groups for group-by-group detection; a framing set of code markings associated with each group of intelligence code markings and positioned on the panel in a fixed position relative to the position of its associated intelligence code marking group; said pickup device including a first group of photosensitive devices for detecting all of one group of intelligence code markings simultaneously, a second group of photosensitive devices for detecting said framing sets of code markings; means for focusing each of said sets of markings upon the respective groups of photosensitive devices simultaneously when a car is appropriately positioned with respect to said pickup device, a storage device for recording intelligence in coded form; circuit means connected with said first group of photosensitive devices for supplying information to said storage device when triggered, and circuit means actuated by said second group of photosensitive devices to trigger the first said circuit means when said second group of photosensitive devices detect a set of frame code markings.

2. Apparatus for transmitting, detecting and recording intelligence between railway cars and a fixed station as said cars move past a pickup device at any normal operating speed comprising: a panel forming a portion of each car; code markings distinctive of certain intelligence on each said panel, said code markings comprising photo differing elements positioned on said panel in successive groups for group-by-group detection; a framing set of code markings associated with each group of intelligence code markings and positioned on the panel in a fixed position relative to the position of its associated intelligence code marking group; said pickup device including a first group of photosensitive devices for detecting all of one group of intelligence code markings simultaneously, a second group of photosensitive devices for detecting said framing sets of code markings; means for focusing each of said sets of markings upon the respective groups of photosensitive devices simultaneously when a car is appropriately positioned with respect to said pickup device, a temporary storage device for recording intelligence in coded form; circuit means connected with said first group of photosensitive devices for supplying information to said temporary storage device when triggered, circuit means actuated by said second group of photosensitive devices to trigger the first said circuit when said second group of photosensitive devices detects a set of frame code markings, a third set of code markings having at least two longitudinally spaced differing code elements on said panel, such that the order of presentation of said differing elements as a car moves past a stationary pickup device informs as to the direction of movement of said car and hence as to the natural or reverse order of presentation of said intelligence groups, means sensitive to said third set of markings, a second information storage system, and means responsive to the last said sensitive means to convey information from said temporary storage device to said second storage system in the order received by said temporary storage device or in the reverse order depending upon the order of presentation of the code elements in said third set of markings to said pickup device.

3. In a system for recording data from railway cars while such cars are in motion, the combination comprising means on individual cars for indicating data peculiar to that car, said indicating means comprising a panel having a plurality of vertical bar markings thereon so arranged that the photoreflecting ability and relative positions of said markings on said panel present said data in binary code, trackside stationary photosensitive pickup means for generating signals when triggered as said cars move past said pickup means in response to said indicating means, means for triggering said pickup means when a panel is in appropriate position before said pickup means, and means responsive to said signals to store the information provided by said indicating means.

4. In a system for recording data from railway cars while such cars are in motion, the combination comprising means on individual cars for indicating data peculiar to that car, said indicating means comprising a panel having a plurality of vertical bar markings thereon so arranged that the photoreflecting ability and relative positions of said markings on said panel present said data in code, trackside stationary photosensitive pickup means for generating signals when triggered as said cars move past said pickup means in response to the photoreflecting ability and positions of said bars, means for triggering said pickup means when a panel is in appropriate position before said pickup means, and an information storage matrix of binary elements adapted to reproduce the pattern of said bars in response to said signals.

5. In a system for recording data from railway cars while such cars are in motion, the combination comprising means on individual cars for indicating data peculiar to that car in photocontrasting binary code, trackside stationary photoelectric pickup means responsive to the indicating means for generating binary coded signals when a car in a train moves past said pickup means, a binary register responsive to said signals to store temporarily the information provided by said indicating means, means adapted when actuated to prevent said signals from affecting said register and to translate the temporarily stored information out of said binary register before the next car in the train moves past said pickup means, means for actuating said translating means when all of the data from one car has been stored in said temporary storage means, and means actuated when all of the information has been translated out of said temporary storage means to reset said binary register for data peculiar to the next adjacent car in the train.

6. Apparatus for transmitting, detecting and recording intelligence between railway cars and a fixed station as said cars move past a pickup device at any normal operating speed comprising: a panel forming a portion of each car; binary code markings distinctive of certain intelligence on each said panel, said markings comprising a pattern of vertical bars with five of said bars representing a conventional symbol, said bars each comprising one of two photo differing elements positioned on said panel in successive groups of five so that each group represents a conventional symbol, a framing set of code markings associated with each group of intelligence code markings and positioned on the panel in a fixed position relative to the position of its associated intelligence code marking group; said pickup device including a first group of photosensitive devices for detecting all of one group of intelligence code markings simultaneously, a second group of photosensitive devices for detecting said framing sets of code markings; means for focusing each of said sets of markings upon the respective groups of photosensitive devices simultaneously when a car is appropriately positioned with respect to said pickup device, a binary storage matrix for recording intelligence in coded form; circuit means connected with said first group of photosensitive devices for supplying information as to one intelligence group to said binary storage matrix simultaneously when actuated, circuit means actuated by said second group of photosensitive devices to actuate the first said circuit whenever said second group of photosensitive devices detects a set of frame code markings, a third set of code markings having at least two longitudinally spaced differing code elements on said panel such that the time order of presentation of said differing elements as a car moves past a stationary pickup device informs as to the direction of movement of said car and hence as to the natural or reverse order of storage of said intelligence groups, circuit means sensitive to said third set of markings, a second information storage system, and means responsive to the last said sensitive means to convey information from said binary matrix, a group at a time, to said second storage system in the order received by said matrix, or in the reverse order depending upon the order of presentation of the code elements in said third set of markings to the last said sensitive means.

7. In a system for recording data from railway cars while such cars are in motion, the combination comprising a car panel having a plurality of vertically elongated photocontrasting markings corresponding to the data in binary code, the panel having additional vertically elongated photocontrasting markings positioned in a predetermined manner relative to the data markings, photosensitive pickup means responsive to the data markings generating signals corresponding to the data, additional photosensitive pickup means positioned in predetermined relation to the first mentioned pickup means and responsive to the additional markings to render the first mentioned pickup means effective for generating signals only when the data markings are in an optimum detection position before the first mentioned pickup means.

8. In a system for recording data from railway cars while such cars are in motion, the combination comprising a car panel having a plurality of vertically elongated photocontrasting markings corresponding to the data in binary code, the panel having additional vertically elongated photocontrasting markings of less width than the code markings and positioned in a predetermined manner relative to the data markings, photosensitive pickup means responsive to the data markings generating signals corresponding to the data, additional photosensitive pickup means positioned in predetermined relation to the first mentioned pickup means responsive to the additional markings to render the first mentioned pickup means effective for generating signals only when the data markings are in an optimum detection position before the first mentioned pickup means.

9. In a system for recording data from railway cars while such cars are in motion, the combination comprising a car panel having a plurality of horizontally contiguous vertically elongated photocontrasting markings corresponding to the data in binary code, the panel having additional vertically elongated photocontrasting markings of less width than the code markings and positioned with their horizontal midpoints corresponding to code marking midpoints, photosensitive pickup means responsive to the data markings generating signals corresponding to the data' additional photosensitive pickup means positioned with their horizontal midpoints corresponding to the first mentioned pickup means and responsive to the additional markings to render the first mentioned pickup means effective for generating signals only when the data markings are horizontally centered before the first mentioned pickup means.

10. The combination of claim 9 in which the data markings and the additional markings are arranged horizontally for group-by-group detection together with a multi-stage shift register serially storing the data in response to succeeding groups of signals.

11. In a system for recording data from railway cars while such cars are in motion at speeds as high as 100 miles per hour, the combination comprising a car panel having a plurality of contiguous vertically elongated photocontrasting markings in the order of 6" x 1" corresponding to the data in binary code, the panel having additional vertically elongated photocontrasting markings in the order of 6" x ½" with their horizontal centers corresponding to the centers of certain of the code markings positioned in a predetermined manner relative to the data markings, photosensitive pickup means responsive to the data markings generating signals corresponding to the data, additional photosensitive pickup means adapted for sensing the midpoints of the additional markings when the first mentioned pickup means sense the midpoints of data markings and responsive to the additional markings to render the first mentioned pickup means effective for generating signals only when the data markings are horizontally centered for detection by the first mentioned pickup means.

12. The combination of claim 11 together with means including a lens normally focusing a vertically central circular portion of the markings approximately 1" in diameter upon the respective pickup means when the car bearing the panel is free of sway and of settling due to heavy loading.

13. In a system for recording data from a series of connected railway cars while such cars are in motion, the combination comprising a panel on each car indicating data peculiar to that car in photocontrasting binary code, the markings being grouped in a space relatively short in relation to the length of the car, stationary photosensitive pickup means responsive to the coded data for generating binary code signals corresponding to the data as the panel moves past the pickup means, a binary register responsive to the signals to store the data temporarily, a permanent storage means, circuit means effective when all of the data on a panel is stored in the register for transferring the data to the permanent storage means before the panel of the next succeeding car moves into position before the pickup means, and circuit means effective upon transfer of all of the data to the permanent storage means to condition the register and the first mentioned circuit means for receiving and transferring data peculiar to the next succeeding car.

14. In a system for recording data from a series of connected railway cars while such cars are in motion, the combination comprising a panel on each car indicating data peculiar to that car in photocontrasting binary code, the markings being grouped in a space relatively short in relation to the length of the car, stationary photosensitive pickup means responsive to the coded data for generating signals corresponding to the data as the panel moves past the pickup means, a register responsive to the signals to store the data temporarily, a permanent storage means, and circuit means effective when all of the data on a panel is stored in the register for transferring the data to the permanent storage means before the panel of the next succeeding car moves into position before the pickup means.

15. In a system for recording data from a series of connected railway cars while such cars are in motion, the combination comprising a panel forming a portion of each car, photocontrasting data markings on the panel positioned in succesive groups lengthwise of the panel for group-by-group detection, the first group corresponding to a start of data indication and the last group corresponding to the end of data indication, an additional group of photocontrasting markings for each of the data groups and positioned in a predetermined manner relative thereto, a first set of photosensitive pickup means responsive to each group of data markings for generating signals corresponding thereto, additional photosensitive pickup means positioned in predetermined relation to the first mentioned pickup means and responsive to the additional markings to render the first mentioned pickup means effective for generating signals only when each group of data markings is in an appropriate position before the first mentioned pickup means, a shift register responsive to each group of signals from the first mentioned pickup means for temporarily storing the data in the order received, a second shift register, circuit means responsive to the start and end of code signals for transferring the data from the first shift register to the second shift register in the event that the end of data signals precede the start of data signals, additional data storage means, and circuit means responsive to the start and end of data signals to cause transfer of the stored data alternatively from the first shift register group-by-group in the order in which the data is detected by the pickup means or group-by-group from the second shift register in the reverse order to the additional storage means, whereby data is detected and stored in proper order irrespective of the direction in which the train passes pickup means.

16. In a system for recording data from a series of connected railway cars while such cars are in motion, the combination comprising a panel forming a portion of each car, vertically elongated photocontrasting data markings on the panel positioned in successive groups lengthwise of the panel for group-by-group detection, the first group corresponding to a start of data indication and the last group corresponding to an end of data indication, an additional group of photocontrasting markings for each of the data groups and positioned in a predetermined manner relative thereto, the additional markings being horizontally narrower than the data markings, a first set of photosensitive pickup means responsive to each group of data markings for generating signals corresponding thereto, additional photosensitive pickup means positioned in predetermined relation to the first mentioned pickup means and responsive to the additional markings to render the first mentioned pickup means effective for generating signals only when each group of data markings is in a centered position before the first mentioned pickup means, a shift register responsive to each group of signals from the first mentioned pickup means for temporarily storing the data in the order received, a second shift register circuit means responsive to the start and end of code signals for transferring the data from the first shift register to the second shift register in the event that the end of data signals precede the start of data signals, additional data storage means, and circuit means responsive to the start and end of data signals to cause transfer of the stored data alternatively from the first shift register group-by-group in the order in which the data is detected by the pickup means or group-by-group from the second shift register in the reverse order to the additional storage means, whereby data is detected and stored in proper order irrespective of the direction in which the train passes pickup means.

17. In a system for recording data from a series of connected railway cars while such cars are in motion, the combination comprising a panel forming a portion of each car, vertically elongated photocontrasting data markings on the panel positioned in successive groups lengthwise of the panel for group-by-group detection, the first group corresponding to a start of data indication and the last group corresponding to an end of data indication, an additional group of photocontrasting markings for each of the data groups and positioned in a predetermined manner relative thereto, the additional markings being horizontally narrower than the data markings, a first set of photosensitive pickup means responsive to each group of data markings for generating signals corresponding thereto, additional photosensitive pickup means positioned in predetermined relation to the first mentioned pickup means and responsive to the additional markings to render the first mentioned pickup means effective for generating signals only when each group of data markings is in a centered position before the first mentioned pickup means, a stationary, multi-stage shift register responsive to each group of signals from the first mentioned pickup means for temporarily storing the data in the first stage, time delay circuit means controlled by the additional pickup means shifting the stored data one stage during the interval between successive groups of data signals, a second stationary, multi-stage shift register, circuit means responsive to the start and end of code signals for transferring the data from the first shift register to the second shift register in the event that the end of data signals precede the start of the data signals, additional data storage means, and circuit means responsive to the start and end of data signals to cause transfer of the stored data alternatively from the first shift register group-by-group in the order in which the data is detected by the pickup means or group-by-group from the second shift register in the reverse order to the additional storage means, whereby data is detected and stored in proper order irrespective of the direction in which the train passes pickup means.

18. In a system for detecting and recording data carried by railway cars while such cars are in motion, the combination comprising a panel on each car having a plurality of vertically elongated photocontrasting markings corresponding to data peculiar to that car in binary code, the markings arranged in horizontally succeeding groups on each panel for sequential group-by-group detection, trackside photosensitive pickup means responsive to the data markings as they pass the pickup means and effective when triggered for generating signals corresponding to the data markings, means triggering the pickup means when each marking group is in an appropriate position before the pickup means, a multi-stage stationary shift register responsive to the signals corresponding to each marking group for storing the marking group in its first stage, time delay circuit means responsive to the triggering means applying a shift pulse to the shift register stages to advance the marking groups one stage during the interval between the detection of succeeding marking groups, a permanent storage means, and circuit means effective when all of the data on one panel is stored in the shift register for periodically applying shift pulses to the shift register to transfer the data serially from the shift register into the storage means during intervals between the detection of the data on each panel.

19. In a system for detecting and recording data carried by railway cars while such cars are in motion, the combination comprising a panel on each car having a plurality of vertically elongated photocontrasting markings corresponding to data peculiar to that car in binary code, trackside photosensitive pickup means responsive to the data markings as they pass the pickup means and effective when triggered for generating signals corresponding to the data, means triggering the pickup means when a panel is in an appropriate position before the pickup means, a stationary shift register responsive to the signals for temporarily storing the data, a permanent storage means, and circuit means effective when all of the data on one panel is stored in the shift register for periodically applying shift pulses to the shift register to transfer the data serially from the shift register into the storage means during intervals between the detection of the data on each panel.

References Cited in the file of this patent

UNITED STATES PATENTS

| | | |
|---|---|---|
| 1,130,452 | Vedder | Mar. 2, 1915 |
| 1,797,864 | Harlandt | Mar. 24, 1931 |
| 2,122,358 | Preston | June 28, 1938 |
| 2,350,893 | Hofgaard | June 6, 1944 |
| 2,581,552 | O'Hagan et al. | Jan. 8, 1952 |
| 2,751,433 | Linger | June 19, 1956 |
| 2,753,550 | Treharne | July 3, 1956 |